United States Patent
Colgrove et al.

(10) Patent No.: US 11,392,565 B1
(45) Date of Patent: *Jul. 19, 2022

(54) OPTIMIZING DATA COMPRESSION IN A STORAGE SYSTEM

(71) Applicant: PURE STORAGE, INC., Mountain View, CA (US)

(72) Inventors: John Colgrove, Los Altos, CA (US); Joern Engel, Mountain View, CA (US); Christopher Golden, Emerald Hills, CA (US); Ethan Miller, Santa Cruz, CA (US); Naveen Neelakantam, Mountain View, CA (US)

(73) Assignee: PURE STORAGE, INC., Mountain View, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/743,024

(22) Filed: Jan. 15, 2020

Related U.S. Application Data

(63) Continuation of application No. 15/041,307, filed on Feb. 11, 2016, now Pat. No. 10,572,460.

(51) Int. Cl.
*G06F 16/22* (2019.01)
*G06F 16/23* (2019.01)
*G06F 3/06* (2006.01)

(52) U.S. Cl.
CPC .............. *G06F 16/22* (2019.01); *G06F 3/061* (2013.01); *G06F 3/064* (2013.01); *G06F 3/067* (2013.01);

(Continued)

(58) Field of Classification Search
CPC ...... G06F 3/0608; G06F 3/0638; G06F 3/064; G06F 3/067; G06F 16/22; G06F 16/2365; G06F 3/061

See application file for complete search history.

(56) References Cited

U.S. PATENT DOCUMENTS 5,191,548 A 3/1993 Balkanski et al.
5,686,961 A 11/1997 Gasztonyi et al.
(Continued)

FOREIGN PATENT DOCUMENTS

EP 0725324 A2 8/1996
EP 3414652 A1 12/2018
(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
(Continued)

*Primary Examiner* — Merilyn P Nguyen

(57) ABSTRACT

Compressing data in dependence upon characteristics of a storage system, including: receiving an amount of processing resources available in the storage system; receiving an amount of space available in the storage system; and selecting, in dependence upon the priority for conserving the amount of processing resources and the amount of space, a data compression algorithm to utilize to compress the data.

20 Claims, 9 Drawing Sheets

(52) U.S. Cl.
CPC .......... *G06F 3/0608* (2013.01); *G06F 3/0638* (2013.01); *G06F 16/2365* (2019.01)

(56) References Cited

U.S. PATENT DOCUMENTS

| | | | |
|---|---|---|---|
| 5,706,210 | A | 1/1998 | Kumano et al. |
| 5,799,200 | A | 8/1998 | Brant et al. |
| 5,918,225 | A | 6/1999 | White et al. |
| 5,933,598 | A | 8/1999 | Scales et al. |
| 6,012,032 | A | 1/2000 | Donovan et al. |
| 6,085,333 | A | 7/2000 | DeKoning et al. |
| 6,393,584 | B1* | 5/2002 | McLaren .............. G06F 9/4418 714/24 |
| 6,643,641 | B1 | 11/2003 | Snyder |
| 6,647,514 | B1 | 11/2003 | Umberger et al. |
| 6,789,162 | B1 | 9/2004 | Talagala et al. |
| 7,024,414 | B2* | 4/2006 | Sah ....................... G06F 16/284 |
| 7,089,272 | B1 | 8/2006 | Garthwaite et al. |
| 7,107,389 | B2 | 9/2006 | Inagaki et al. |
| 7,123,718 | B1 | 10/2006 | Moskowitz et al. |
| 7,146,521 | B1 | 12/2006 | Nguyen |
| 7,334,124 | B2 | 2/2008 | Pham et al. |
| 7,437,530 | B1 | 10/2008 | Rajan |
| 7,493,424 | B1 | 2/2009 | Bali et al. |
| 7,669,029 | B1 | 2/2010 | Mishra et al. |
| 7,689,609 | B2 | 3/2010 | Lango et al. |
| 7,743,191 | B1 | 6/2010 | Liao |
| 7,899,780 | B1 | 3/2011 | Shmuylovich et al. |
| 8,042,163 | B1 | 10/2011 | Karr et al. |
| 8,086,585 | B1 | 12/2011 | Brashers et al. |
| 8,140,821 | B1 | 3/2012 | Raizen et al. |
| 8,200,887 | B2 | 6/2012 | Bennett |
| 8,271,700 | B1 | 9/2012 | Annem et al. |
| 8,369,324 | B1 | 2/2013 | Breight et al. |
| 8,387,136 | B2 | 2/2013 | Lee et al. |
| 8,422,733 | B2* | 4/2013 | Reisman ........ H04N 21/234327 369/13.38 |
| 8,437,189 | B1 | 5/2013 | Montierth et al. |
| 8,465,332 | B2 | 6/2013 | Hogan et al. |
| 8,527,544 | B1 | 9/2013 | Colgrove et al. |
| 8,566,546 | B1 | 10/2013 | Marshak et al. |
| 8,578,442 | B1 | 11/2013 | Banerjee |
| 8,613,066 | B1 | 12/2013 | Brezinski et al. |
| 8,620,970 | B2 | 12/2013 | English et al. |
| 8,751,463 | B1 | 6/2014 | Chamness |
| 8,762,642 | B2 | 6/2014 | Bates et al. |
| 8,769,622 | B2 | 7/2014 | Chang et al. |
| 8,800,009 | B1 | 8/2014 | Beda et al. |
| 8,812,860 | B1 | 8/2014 | Bray |
| 8,850,546 | B1 | 9/2014 | Field et al. |
| 8,898,346 | B1 | 11/2014 | Simmons |
| 8,909,854 | B2 | 12/2014 | Yamagishi et al. |
| 8,931,041 | B1 | 1/2015 | Banerjee |
| 8,949,863 | B1 | 2/2015 | Coatney et al. |
| 8,984,602 | B1 | 3/2015 | Bailey et al. |
| 8,990,905 | B1 | 3/2015 | Bailey et al. |
| 9,081,713 | B1 | 7/2015 | Bennett et al. |
| 9,124,569 | B2 | 9/2015 | Hussain et al. |
| 9,134,922 | B2 | 9/2015 | Rajagopal et al. |
| 9,189,334 | B2 | 11/2015 | Bennett et al. |
| 9,209,973 | B2 | 12/2015 | Aikas et al. |
| 9,235,590 | B1* | 1/2016 | Wang .................. H03M 7/6064 |
| 9,250,823 | B1 | 2/2016 | Kamat et al. |
| 9,300,660 | B1 | 3/2016 | Borowiec et al. |
| 9,311,182 | B2 | 4/2016 | Bennett |
| 9,444,822 | B1 | 9/2016 | Borowiec et al. |
| 9,507,532 | B1 | 11/2016 | Colgrove et al. |
| 9,632,870 | B2 | 4/2017 | Bennett et al. |
| 10,769,016 | B2* | 9/2020 | Leggette .............. G06F 16/951 |
| 2002/0013802 | A1 | 1/2002 | Mori et al. |
| 2003/0056146 | A1* | 3/2003 | Freeman .............. G06K 15/00 714/25 |
| 2003/0145172 | A1 | 7/2003 | Galbraith et al. |
| 2003/0191783 | A1 | 10/2003 | Wolczko et al. |
| 2003/0225961 | A1 | 12/2003 | Chow et al. |
| 2004/0080985 | A1 | 4/2004 | Chang et al. |
| 2004/0111573 | A1 | 6/2004 | Garthwaite |
| 2004/0153844 | A1 | 8/2004 | Ghose et al. |
| 2004/0193814 | A1 | 9/2004 | Erickson et al. |
| 2004/0260967 | A1 | 12/2004 | Guha et al. |
| 2005/0160416 | A1 | 7/2005 | Jamison et al. |
| 2005/0188246 | A1 | 8/2005 | Emberty et al. |
| 2005/0216800 | A1 | 9/2005 | Bicknell et al. |
| 2005/0288836 | A1 | 12/2005 | Glass et al. |
| 2006/0015771 | A1 | 1/2006 | van Gundy et al. |
| 2006/0129817 | A1 | 6/2006 | Borneman et al. |
| 2006/0161726 | A1 | 7/2006 | Lasser |
| 2006/0230245 | A1 | 10/2006 | Gounares et al. |
| 2006/0239075 | A1 | 10/2006 | Williams et al. |
| 2007/0022227 | A1 | 1/2007 | Miki |
| 2007/0028068 | A1 | 2/2007 | Golding et al. |
| 2007/0038738 | A1* | 2/2007 | Iyengar ............... G06F 11/3466 709/224 |
| 2007/0055702 | A1 | 3/2007 | Fridella et al. |
| 2007/0109856 | A1 | 5/2007 | Pellicone et al. |
| 2007/0150689 | A1 | 6/2007 | Pandit et al. |
| 2007/0168321 | A1 | 7/2007 | Saito et al. |
| 2007/0220227 | A1 | 9/2007 | Long |
| 2007/0294563 | A1 | 12/2007 | Bose |
| 2007/0294564 | A1 | 12/2007 | Reddin et al. |
| 2008/0005587 | A1 | 1/2008 | Ahlquist |
| 2008/0050029 | A1 | 2/2008 | Bashyam et al. |
| 2008/0077825 | A1 | 3/2008 | Bello et al. |
| 2008/0162674 | A1 | 7/2008 | Dahiya |
| 2008/0195833 | A1 | 8/2008 | Park |
| 2008/0253330 | A1 | 10/2008 | Bartlett |
| 2008/0270678 | A1 | 10/2008 | Cornwell et al. |
| 2008/0282045 | A1 | 11/2008 | Biswas et al. |
| 2009/0077340 | A1 | 3/2009 | Johnson et al. |
| 2009/0100115 | A1 | 4/2009 | Park et al. |
| 2009/0198889 | A1 | 8/2009 | Ito et al. |
| 2010/0052625 | A1 | 3/2010 | Cagno et al. |
| 2010/0211723 | A1 | 8/2010 | Mukaida |
| 2010/0246266 | A1 | 9/2010 | Park et al. |
| 2010/0257142 | A1 | 10/2010 | Murphy et al. |
| 2010/0262764 | A1 | 10/2010 | Liu et al. |
| 2010/0325345 | A1 | 12/2010 | Ohno et al. |
| 2010/0332754 | A1 | 12/2010 | Lai et al. |
| 2011/0072290 | A1 | 3/2011 | Davis et al. |
| 2011/0106769 | A1* | 5/2011 | Baptist ................ H04L 67/1097 707/E17.007 |
| 2011/0125955 | A1 | 5/2011 | Chen |
| 2011/0131231 | A1 | 6/2011 | Haas et al. |
| 2011/0167221 | A1 | 7/2011 | Pangal et al. |
| 2012/0023144 | A1 | 1/2012 | Rub |
| 2012/0054264 | A1 | 3/2012 | Haugh et al. |
| 2012/0079318 | A1 | 3/2012 | Colgrove et al. |
| 2012/0131253 | A1 | 5/2012 | McKnight et al. |
| 2012/0254417 | A1 | 10/2012 | Luna |
| 2012/0303919 | A1 | 11/2012 | Hu et al. |
| 2012/0311000 | A1 | 12/2012 | Post et al. |
| 2013/0007845 | A1 | 1/2013 | Chang et al. |
| 2013/0031414 | A1 | 1/2013 | Dhuse et al. |
| 2013/0036272 | A1 | 2/2013 | Nelson |
| 2013/0071087 | A1 | 3/2013 | Motiwala et al. |
| 2013/0145447 | A1 | 6/2013 | Maron |
| 2013/0191555 | A1 | 7/2013 | Liu |
| 2013/0198459 | A1 | 8/2013 | Joshi et al. |
| 2013/0205067 | A1 | 8/2013 | Kettner |
| 2013/0205173 | A1 | 8/2013 | Yoneda |
| 2013/0219164 | A1 | 8/2013 | Hamid |
| 2013/0227201 | A1 | 8/2013 | Talagala et al. |
| 2013/0275396 | A1* | 10/2013 | Condict ................ H03M 7/607 707/693 |
| 2013/0290607 | A1 | 10/2013 | Chang et al. |
| 2013/0311434 | A1 | 11/2013 | Jones |
| 2013/0318297 | A1 | 11/2013 | Jibbe et al. |
| 2013/0332614 | A1 | 12/2013 | Brunk et al. |
| 2014/0020083 | A1 | 1/2014 | Fetik |
| 2014/0074850 | A1 | 3/2014 | Noel et al. |
| 2014/0082715 | A1 | 3/2014 | Grajek et al. |
| 2014/0086146 | A1 | 3/2014 | Kim et al. |
| 2014/0090009 | A1 | 3/2014 | Li et al. |
| 2014/0096220 | A1 | 4/2014 | Pinto et al. |

(56) References Cited

U.S. PATENT DOCUMENTS

| | | |
|---|---|---|
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0237201 A1 | 8/2014 | Swift |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0347331 A1 | 11/2014 | Amit et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0293896 A1 | 10/2015 | Runkis et al. |
| 2015/0339059 A1 | 11/2015 | Kang et al. |
| 2015/0347443 A1 | 12/2015 | Reid et al. |
| 2015/0358537 A1 | 12/2015 | Mirza |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2019/0073306 A1* | 3/2019 | Kowles ............... G06F 12/0862 |

FOREIGN PATENT DOCUMENTS

| | | |
|---|---|---|
| WO | 2012087648 A2 | 6/2012 |
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2017138990 A1 | 8/2017 |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001 099/001/01.01.01_60/gs_NFV-REL001v010101p.pdf.

Faith, "dietzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2016/059787, dated Jan. 17, 2017, 10 pages.

Kong, "Using PCI Express As The Primary System Interconnect In Multiroot Compute, Storage, Communications And Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrd_Identity_Datasheet.pdf.

Microsoft, "Hybrid Identity", Microsoft (online), Apr. 2014, 36 pages, URL: www.aka.ms/HybridIdentityWp.

Paul Sweere, "Creating Storage Class Persistent Memory with NVDIMM", Published in Aug. 2013, Flash Memory Summit 2013, 22 pages.

PCMAG, "Storage Array Definition", Published May 10, 2013, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI 10.1145/1456469.1456471.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array html.

Wikipedia, "Convergent Encryption", Wikipedia.org (online), accessed Sep. 8, 2015, 2 pages, URL: en. wikipedia.org/wiki/Convergent_encryption.

* cited by examiner

OPTIMIZING DATA COMPRESSION IN A STORAGE SYSTEM

CROSS-REFERENCE TO RELATED APPLICATION

This application is a continuation application of and claims priority from U.S. patent application Ser. No. 15/041,307, filed on Feb. 11, 2016, which is now U.S. Pat. No. 10,572,460 issued Feb. 25, 2020.

BACKGROUND

Technical Field

The field of the disclosure is data processing, or, more specifically, methods, apparatus, and products for compressing data in dependence upon characteristics of a storage system.

Background Art

Enterprise storage systems frequently include a plurality of storage devices. Each of the storage devices may be capable of storing a particular amount of data, and as such, the storage system as a whole is characterized by the cumulative capacity of the storage devices that make up the storage system. In order to better utilize the capacity of the storage system, data reduction techniques are often applied to reduce the size of the data stored in the storage system. One such technique is data compression. Data compression, however, is frequently carried out in an unsophisticated, non-optimal manner.

SUMMARY OF INVENTION

Methods, apparatuses, and products for compressing data in dependence upon characteristics of a storage system, including: receiving an amount of processing resources available in the storage system; receiving an amount of space available in the storage system; and selecting, in dependence upon a priority for conserving the amount of processing resources and the amount of space, a data compression algorithm to utilize to compress the data.

The foregoing and other objects, features and advantages of the disclosure will be apparent from the following more particular descriptions of example embodiments of the disclosure as illustrated in the accompanying drawings wherein like reference numbers generally represent like parts of example embodiments of the disclosure.

DESCRIPTION OF EMBODIMENTS

Figure 1:
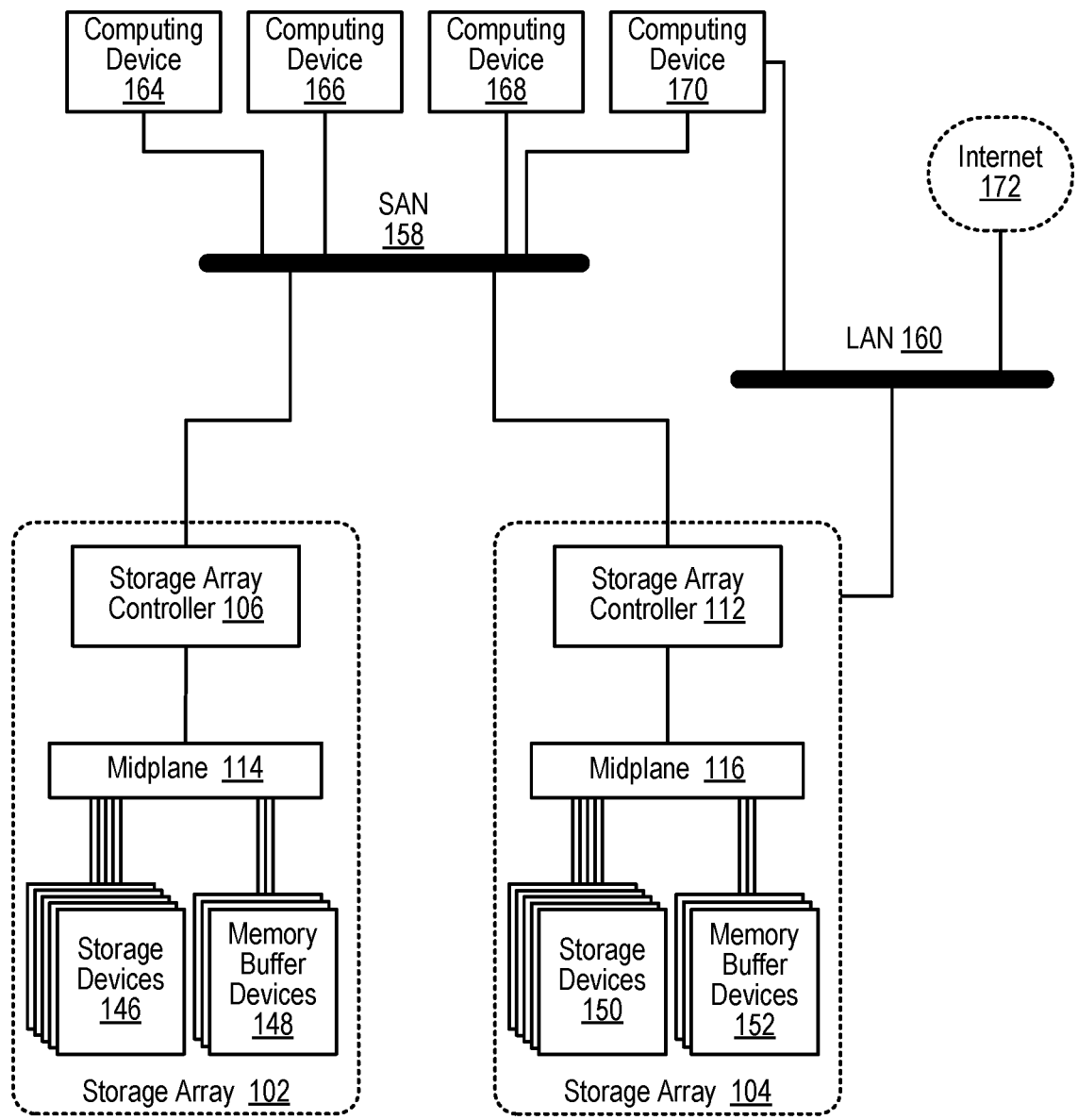
FIG. 1 sets forth a block diagram of a storage system configured for compressing data in dependence upon characteristics of the storage system according to embodiments of the present disclosure.

Example methods, apparatuses, and products for compressing data in dependence upon characteristics of a storage system in accordance with the present disclosure are described with reference to the accompanying drawings, beginning with FIG. 1. FIG. 1 sets forth a block diagram of a storage system configured for compressing data in dependence upon characteristics of the storage system according to embodiments of the present disclosure. The storage system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be useful in compressing data in dependence upon characteristics of a storage system according to embodiments of the present disclosure. The storage array controllers (106, 112) may assist in intelligently compressing data by receiving an amount of processing resources available in the storage system, receiving an amount of space available in the storage system, and selecting a data compression algorithm to utilize to compress the data in dependence upon a priority for conserving the amount of processing resources and the amount of space, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Compressing data in dependence upon characteristics of a storage system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in compressing data in dependence upon characteristics of a storage system according to embodiments of the present disclosure.

Figure 2:
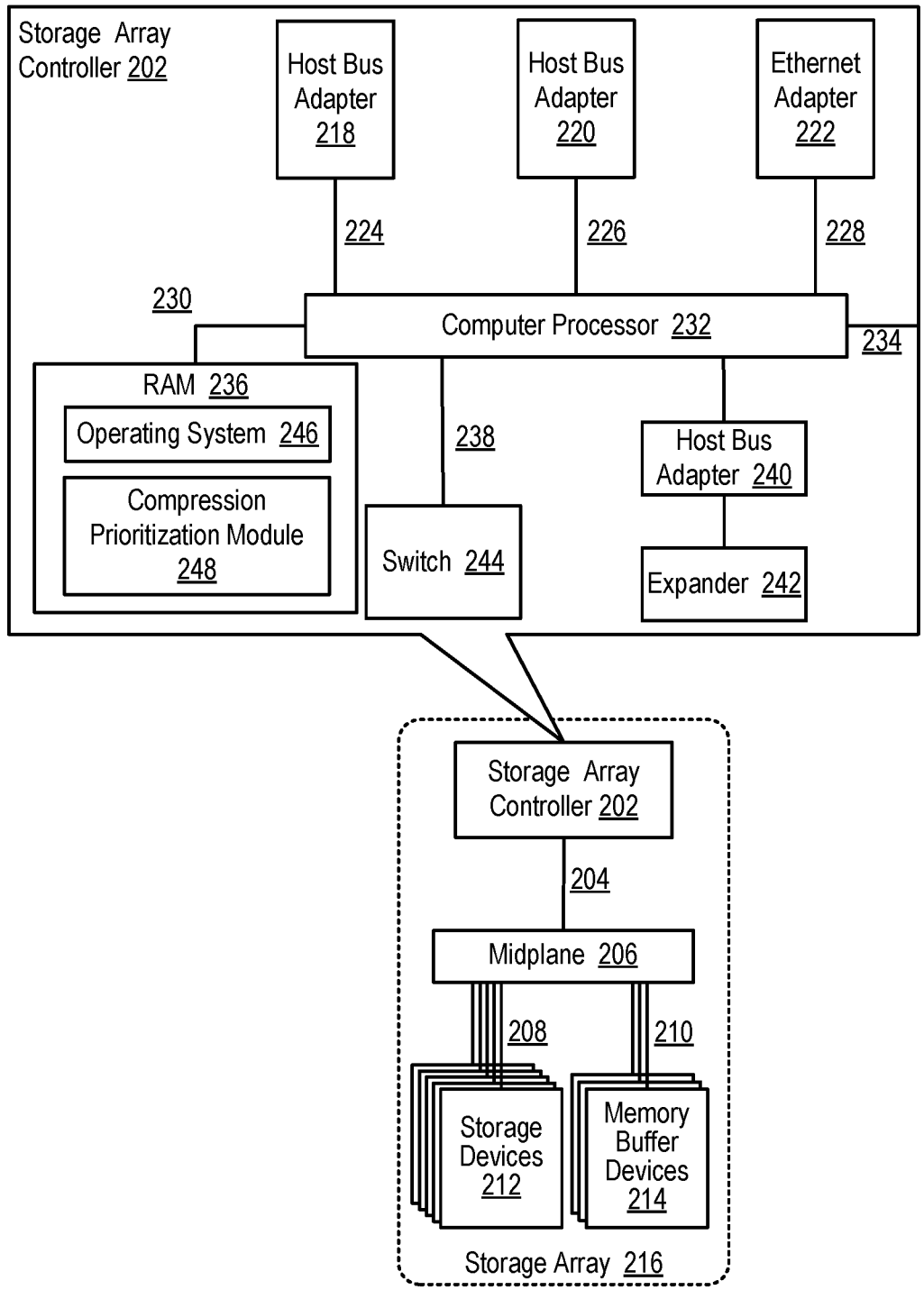
FIG. 2 sets forth a block diagram of a storage array controller useful in compressing data in dependence upon characteristics of a storage system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for intelligently compressing data in a storage array according to embodiments of the present disclosure include UNIX™, Linux™, Microsoft Windows™, and others as will occur to those of skill in the art. Also stored in RAM (236) is a compression optimization module (248), a module that includes computer program instructions useful in compressing data in dependence upon characteristics of a storage system that includes a plurality of storage devices according to embodiments of the present disclosure.

The compression optimization module (248) may compress data in dependence upon characteristics of a storage system by: receiving an amount of processing resources available in the storage system, receiving an amount of space available in the storage system, and selecting, in dependence upon a priority for conserving the amount of processing resources and the amount of space, a data compression algorithm to utilize to compress the data, as will be described in greater detail below.

The compression optimization module (248) may further intelligently compress data in a storage array that includes a plurality of storage devices by: determining an expected amount of space in the storage system to be consumed within a predetermined period of time, determining an expected amount of processing resources to be consumed by compressing the data utilizing the data compression algorithm for each of a plurality of data compression algorithms, determining an expected amount of data reduction to be achieved by compressing the data utilizing the data compression algorithm for each of a plurality of data compression algorithms, determining, an expected decompression speed associated with decompressing the data for each of a plurality of data compression algorithms, determining an average decompression speed associated with decompressing a pool of data for each of a plurality of data compression algorithms, compressing at least a portion of the data utilizing a plurality of data compression algorithms, identifying a data reduction level achieved by each data compression algorithm, determining a decompression speed associated with each data compression algorithm, and selecting the data compression algorithm to utilize to compress the data in dependence upon the data reduction level achieved by each data compression algorithm and the decompression speed associated with each data compression algorithm, as will be described in greater detail below.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
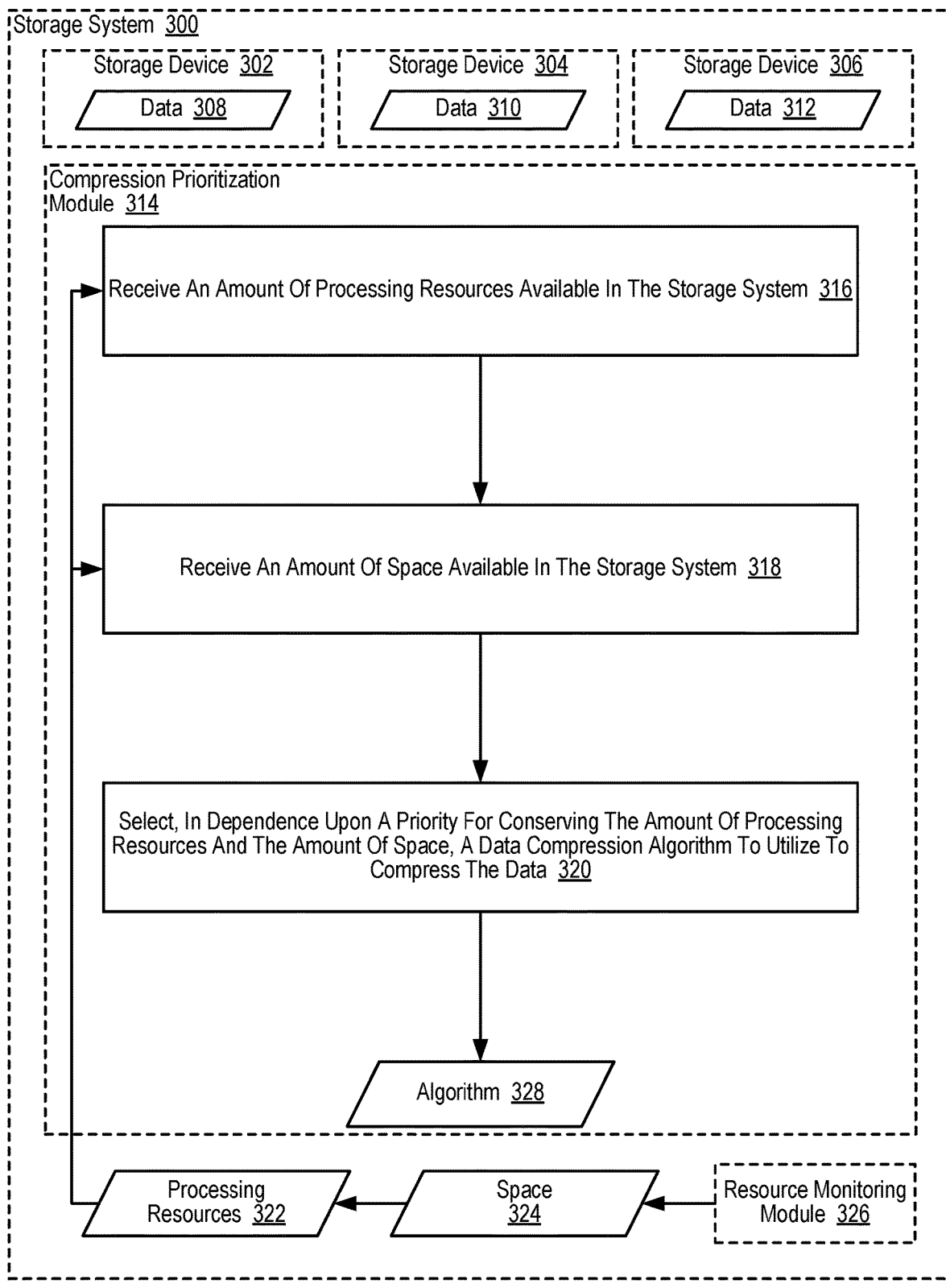
FIG. 3 sets forth a flow chart illustrating an example method for compressing data in dependence upon characteristics of a storage system according to embodiments of the present disclosure.

For further explanation, FIG. 3 sets forth a flow chart illustrating an example method for compressing data in dependence upon characteristics of a storage system (300) according to embodiments of the present disclosure. Although depicted in less detail, the storage system (300) of FIG. 3 may be similar to the storage arrays described above with reference to FIG. 1. The storage system (300) of FIG. 3 includes a plurality of storage devices (302, 304, 306), each of which may be used to store data (308, 310, 312).

The example method depicted in FIG. 3 is carried out, at least in part, by a compression prioritization module (314). The compression prioritization module (314) may be embodied, for example, as a module of computer software executing on computer hardware such as a computer processor. The compression prioritization module (314) may be executing, for example, on a storage array controller such as the storage array controllers that are described above with reference to FIG. 1 and FIG. 2.

The example method depicted in FIG. 3 also includes receiving (316) an amount of processing resources (322) available in the storage system (300). The amount of processing resources (322) available in the storage system (300) may include, for example, a number of CPU processing cycles that are available per unit of time, a percentage of the all CPU processing cycles that are available, an amount of memory that is available, and so on. The amount of processing resources (322) available in the storage system (300) may be received (316), for example, by a resource monitoring module (326) that tracks resource utilization in the system, by the compression prioritization module (314) itself, or by any other module that is included in the storage system (300) or operable to otherwise manage the storage system (300). Readers will appreciate that the amount of processing resources (322) available in the storage system (300) may be determined based on historical information, based on the current load (e.g., the number of IOPS directed to the storage system) of the computing system (300) and the hardware resources of the computing system (300), based on any other indicia of the amount of processing resources (322) available in the storage system (300) that will occur to those of skill in the art in view of the teachings contained in this disclosure, or based on any combination thereof. As such, the amount of processing resources (322) available in the storage system (300) may be speculatively determined based on past system performance, current system performance, or any combination thereof.

The example method depicted in FIG. 3 also includes receiving (318) an amount of space (324) available in the storage system (300). The amount of space (324) available in the storage system (300) can represent the cumulative amount of available storage on the storage devices (302, 304, 306) in the storage system (300). The amount of space (324) available in the storage system (300) may be received (318) by the compression prioritization module (314), for example, by a resource monitoring module (326) that tracks resource utilization in the system, by the compression prioritization module (314) itself, or by any other module that is included in the storage system (300) or operable to otherwise manage the storage system (300).

Readers will appreciate that the amount of space (324) available in the storage system (300) is distinct from the amount of available memory that may be included as part of the amount of processing resources (322) available in the storage system (300). The amount of space (324) available in the storage system (300) represents the amount of long-term, persistent storage that is available within the storage devices (302, 304, 306) that are included in the storage system (300). The amount of space (324) that is available in the storage system (300) may include not only space that is available in the traditional sense, but also space that is currently in use but may be reclaimed through the use of one or more data reduction techniques such as garbage collection. In contrast to the amount of space (324) available in the storage system (300), the amount of available memory that may be included as part of the amount of processing resources (322) available in the storage system (300) represents short-term, possibly volatile, memory that is available for use in performing data compression operations. The amount of available memory that may be included as part of the amount of processing resources (322) available in the storage system (300) may be embodied, for example, as DRAM within a storage array controller such as the storage array controllers described above with reference to FIG. 1 and FIG. 2. Readers will appreciate that when a user of the storage system (300) initiates a request to write data, the data will ultimately be stored within the long-term, persistent storage that is available within the storage devices (302, 304, 306), not within the short-term, possibly volatile, memory that is available for use in performing data compression operations.

The example method depicted in FIG. 3 also includes selecting (320), in dependence upon a priority for conserving the amount of processing resources and the amount of space, a data compression algorithm (328) to utilize to compress the data (308, 310, 312). Examples of data compression algorithms (328) that may be utilized to compress the data can include Lempel-Ziv algorithms, Burrows-Wheeler transform algorithms, dictionary coder algorithms, and many others. The priority for conserving the amount of processing resources and the amount of space may be embodied, for example, as a quantifiable value that represents a preference for conserving processing resources relative to conserving storage resources. For example, the priority may be a level, percentage, or a number representing a balance between processing resources and space. If the priority is determined to be biased towards better utilization of processing resources then a compression algorithm which achieves this outcome will be selected. In this scenario, the amount of space may or may not be optimal in order to receive better utilization of processing resources. If the priority is determined to be biased towards better allocation of space then similarly a compression algorithm will be selected. In this scenario, the amount of processing resources may not be optimal at times and may also vary. In some circumstances, a proportional optimization or balance between the amount of processing resources and amount of space is desired. The priority is placed on achieving an objective towards conserving both processing resources and space. In all of these scenarios, one or more compression algorithms may be selected over a period of time. Conservation of processing resources and space could be embodied as improvements to usage (e.g. less compute, memory, etc.), better utilization (e.g. use of less space, balanced usage of processors, etc.), more efficient use of energy, and performance.

Such a priority may be dynamic as the value changes over time and such a priority may be calculated based on additional factors and could change at different times. For example, one factor that impacts the priority may be the current operating conditions of the system (e.g., processing resources currently available in the storage system, the amount of space currently available in the storage system, the rate at which consumption of each type of resource is accelerating or decelerating), another factor that impacts the priority may be historical operating conditions of the system (e.g., times and dates at which consumption of each type of resource spikes or decreases), another factor that impacts the priority could be system settings (e.g., a general preference to run out of processing resources rather than storage resources, or vice versa), and so on.

In the example method depicted in FIG. 3, selecting (320) a data compression algorithm (328) to utilize to compress the data (308, 310, 312) in dependence upon a priority for conserving the amount of processing resources and the amount of space may be carried out, for example, by applying one or more predetermined formulas that utilizes a priority for conserving the amount of processing resources and the amount of space as an input. Such predetermined formulas may be utilized, for example, to generate a score for each available data compression algorithm, where the data compression algorithm with the lowest or highest score (depending on the particular construction of the predetermined formulas) is ultimately selected (320).

Readers will appreciate that the predetermined formula may be configured to strike a balance between the amount of processing resources (322) available in the storage system (300) and the amount of space (324) available in the storage system. For example, when the amount of processing resources (322) available in the storage system (300) are relatively low, the compression prioritization module (314) may select (320) to compress the data (308, 310, 312) utilizing quick, lightweight compression algorithms that consume relatively small amounts of computing resources and also produce relatively small amounts of data reduction. Alternatively, when the amount of processing resources (322) available in the storage system (300) are relatively large, the compression prioritization module (314) may select (320) to compress the data (308, 310, 312) slower, heavier compression algorithms that consume relatively large amounts of computing resources and also produce relatively large amounts of data reduction. When the amount of space (324) available in the storage system is relatively low, however, the compression prioritization module (314) may select (320) to compress the data (308, 310, 312) using slower, heavier compression algorithms that consume relatively large amounts of computing resources and also produce relatively large amounts of data reduction, as a premium will be placed on data reduction rather than conservation of processing resources in such situations. Alternatively, when the amount of space (324) available in the storage system is relatively high, a premium will be placed conserving processing resources rather than data reduction in such situations.

Figure 4:
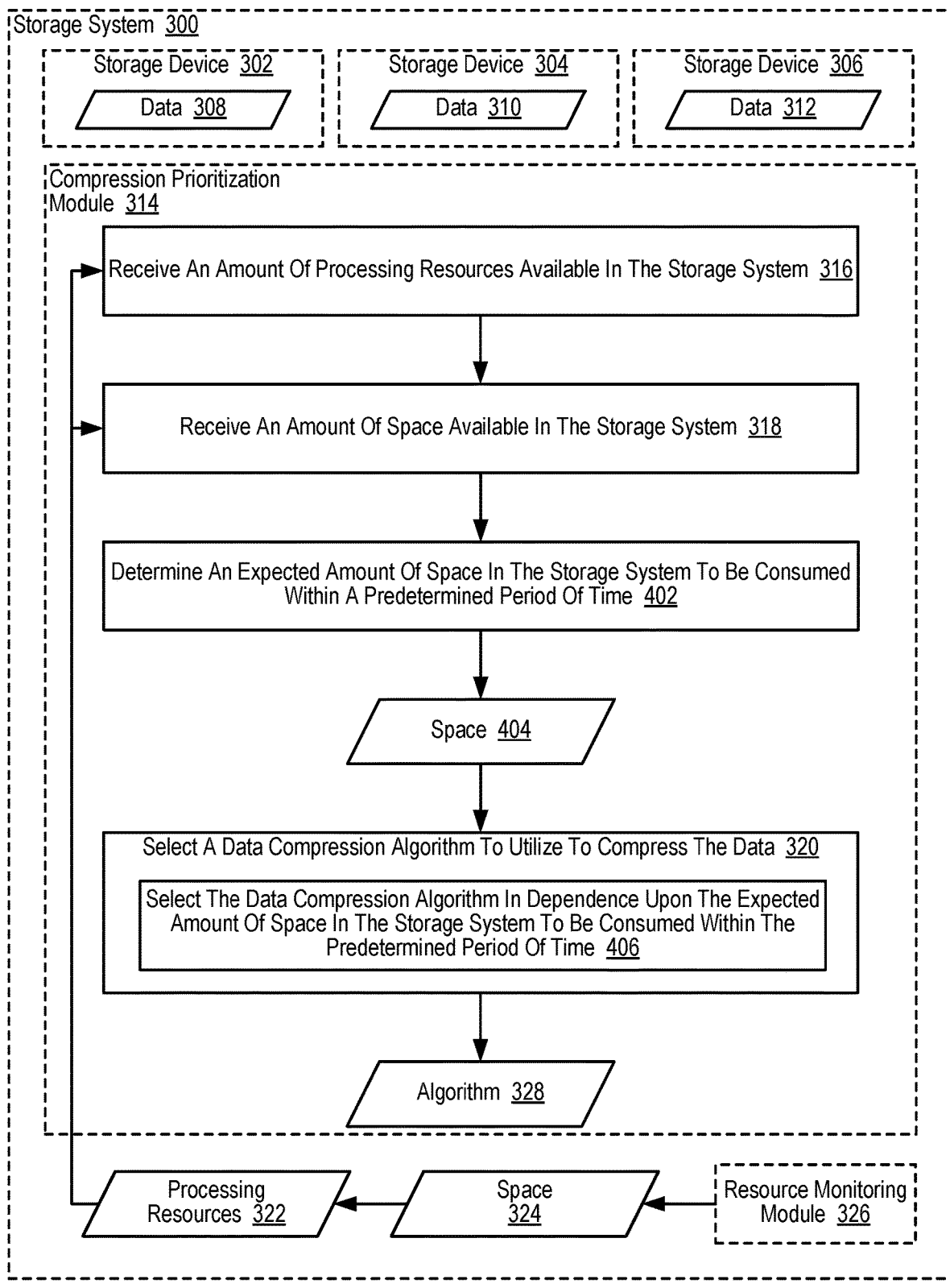
FIG. 4 sets forth a flow chart illustrating a further example method for compressing data in dependence upon characteristics of a storage system according to embodiments of the present disclosure.

For further explanation, FIG. 4 sets forth a flow chart illustrating an additional example method for compressing data in dependence upon characteristics of a storage system (300) according to embodiments of the present disclosure. The example method depicted in FIG. 4 is similar to the example method depicted in FIG. 3, as the example method depicted in FIG. 4 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

The example method depicted in FIG. 4 also includes determining (402) an expected amount of space (404) in the storage system (300) to be consumed within a predetermined period of time. The compression prioritization module (314) of FIG. 4 may determine (402) an expected amount of space (404) in the storage system (300) to be consumed within a predetermined period of time, for example, through the use of historical utilization information. If the compression prioritization module (314) analyzes historical utilization information to determine, for example, that 30 GB of storage within the storage system (300) has been consumed within the last 30 days, the compression prioritization module (314) may determine that users of the storage system (300) will continue to consume storage within the storage system (300) at a rate of 1 GB/day. In such a way, the expected amount of space (404) in the storage system (300) to be consumed within a predetermined period of time may be determined (402) by multiplying the rate at which storage within the storage system (300) has been consumed by the predetermined period of time. The compression prioritization module (314) may additionally be configured to identify trends in usage (e.g., that the rate at which storage is being consumed is increasing or decreasing at a specific rate) and may therefore factor such trends into such a determination (402). Readers will appreciate that determining (402) the expected amount of space (404) in the storage system (300) to be consumed within a predetermined period of time may be carried out in additional ways utilizing historical information, real-time data, or any combination thereof.

In the example method depicted in FIG. 4, determining (402) the expected amount of space (404) in the storage system (300) to be consumed within a predetermined period of time may be carried out by the compression prioritization module (314) receiving one or more messages describing the utilization of storage space within the storage system (300). The one or more messages describing the utilization of storage space within the storage system (300) may be received, for example, from a resource monitoring module (326) that tracks storage utilization in the storage system (300) or by any other module that is included in the storage system (300) or operable to otherwise manage the storage system (300). Alternatively, the utilization of storage space within the storage system (300) may be tracked by the compression prioritization module (314) itself.

In the example method depicted in FIG. 4, the data compression algorithm (328) to utilize is further selected (406) in dependence upon the expected amount of space (404) in the storage system (300) to be consumed within the predetermined period of time. Selecting (406) a data compression algorithm (328) to utilize to compress the data (308, 310, 312) in dependence upon the expected amount of space (404) in the storage system (300) to be consumed within the predetermined period of time may be carried out, for example, by applying one or more predetermined formulas that utilizes the expected amount of space (404) in the storage system (300) to be consumed within the predetermined period of time as an input. Such predetermined formulas may be utilized, for example, to generate a score for each available data compression algorithm, where the data compression algorithm with the lowest or highest score (depending on the particular construction of the predetermined formulas) is ultimately selected (406).

Readers will appreciate that when the expected amount of space (404) in the storage system (300) to be consumed within the predetermined period of time is relatively high, a data compression algorithm that can achieve higher levels of data reduction may be selected (406) even if such a data compression algorithm consumes relatively large amounts of processing resources, given that the available storage within the storage system (300) is being rapidly consumed. Alternatively, when the expected amount of space (404) in the storage system (300) to be consumed within the predetermined period of time is relatively low, a data compression algorithm that consumes relatively small amounts of processing resources may be selected (406) even if such a data compression algorithm only achieves relatively small levels of data reduction, given that the available storage within the storage system (300) is not being rapidly consumed. In such a way, data compression algorithms that achieve higher levels of data reduction may be selected (406) as the expected amount of space (404) in the storage system (300) to be consumed within the predetermined period of time increases, even if selecting such data compression algorithms requires a larger amount of processing resources to execute relative to data compression algorithms that achieve lower levels of data reduction.

Figure 5:
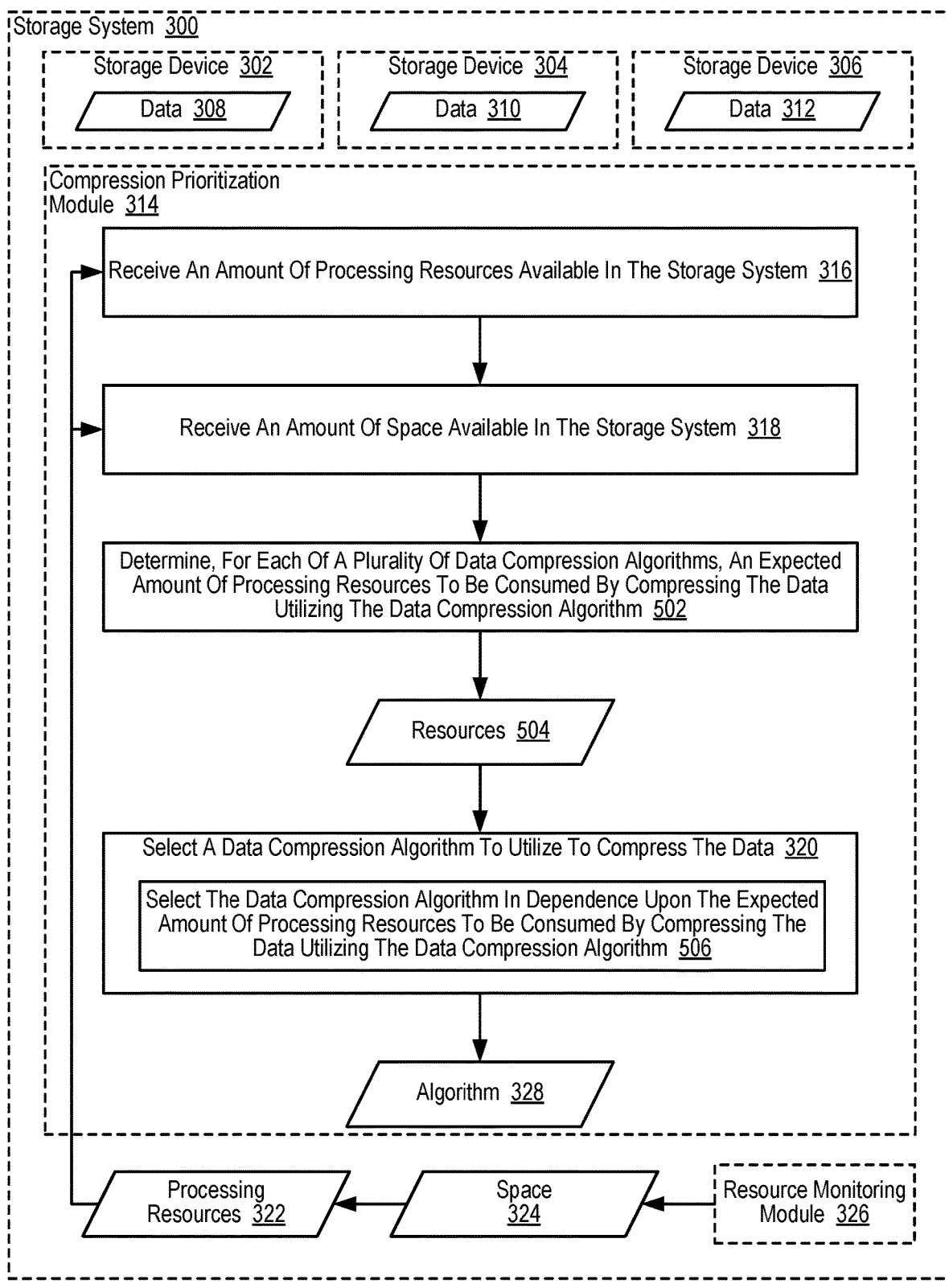
FIG. 5 sets forth a flow chart illustrating a further example method for compressing data in dependence upon characteristics of a storage system according to embodiments of the present disclosure.

For further explanation, FIG. 5 sets forth a flow chart illustrating an additional example method for compressing data in dependence upon characteristics of a storage system (300) according to embodiments of the present disclosure. The example method depicted in FIG. 5 is similar to the example method depicted in FIG. 3, as the example method depicted in FIG. 5 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

The example method depicted in FIG. 5 also includes determining (502), for each of a plurality of data compression algorithms, an expected amount of processing resources (504) to be consumed by compressing the data (308, 310, 312) utilizing the data compression algorithm. The compression prioritization module (314) of FIG. 5 may determine (502) an expected amount of processing resources (504) to be consumed by compressing the data (308, 310, 312) utilizing the data compression algorithm, for example, through the use of historical information gathered when previously compressing data. If the compression prioritization module (314) analyzes historical information gathered when previously compressing data to determine, for example, that a first compression algorithm requires 10,000 processing cycles to compress 1 GB of data, that a second compression algorithm requires 15,000 processing cycles to compress 1 GB of data, and that a third compression algorithm requires 25,000 processing cycles to compress 1 GB of data. In such a way, the expected amount of processing resources (504) to be consumed by compressing the data (308, 310, 312) utilizing the data compression algorithm may be determined (402) by multiplying the rate at which processing resources are historically used to compress data by the amount of data to be compressed.

In the example method depicted in FIG. 5, determining (502) the expected amount of processing resources (504) to be consumed by compressing the data (308, 310, 312) utilizing the data compression algorithm may be carried out by the compression prioritization module (314) receiving one or more messages describing the historical performance of each data compression algorithm. The one or more messages describing the historical performance of each data compression algorithm may be received, for example, from a resource monitoring module (326) that tracks the performance of various compression algorithms or by any other module that is included in the storage system (300) or operable to otherwise manage the storage system (300). Alternatively, the historical performance of each data compression algorithm may be tracked by the compression prioritization module (314) itself.

In the example method depicted in FIG. 5, the data compression algorithm (328) to utilize is further selected (506) in dependence upon the expected amount of processing resources (504) to be consumed by compressing the data (308, 310, 312) utilizing the data compression algorithm. Selecting (506) a data compression algorithm (328) to utilize to compress the data (308, 310, 312) in dependence upon the expected amount of processing resources (504) to be consumed by compressing the data (308, 310, 312) utilizing the data compression algorithm may be carried out, for example, by applying one or more predetermined formulas that utilizes the expected amount of processing resources (504) to be consumed by compressing the data (308, 310, 312) utilizing the data compression algorithm as an input. Such predetermined formulas may be utilized, for example, to generate a score for each available data compression algorithm, where the data compression algorithm with the lowest or highest score (depending on the particular construction of the predetermined formulas) is ultimately selected (506).

Readers will appreciate that when the expected amount of processing resources (504) to be consumed by compressing the data (308, 310, 312) utilizing a particular data compression algorithm is relatively high, such a data compression algorithm may only be selected (506) when the amount of processing resources (322) available in the storage system (300) is also relatively high, in order to avoid performing resource intensive compression when other consumers of processing resources are demanding a relatively high amount of processing resources. Alternatively, when the expected amount of processing resources (504) to be consumed by compressing the data (308, 310, 312) utilizing a particular data compression algorithm is relatively low, such a data algorithm may be selected (506) even when the amount of processing resources (322) available in the storage system (300) is relatively low, as performing such data compression is less likely to prevent other consumers of processing resources from accessing such processing resources. In such a way, data compression algorithms may be selected such that performing data compression does not cause other consumers of processing resources to be blocked from accessing such processing resources.

Figure 6:
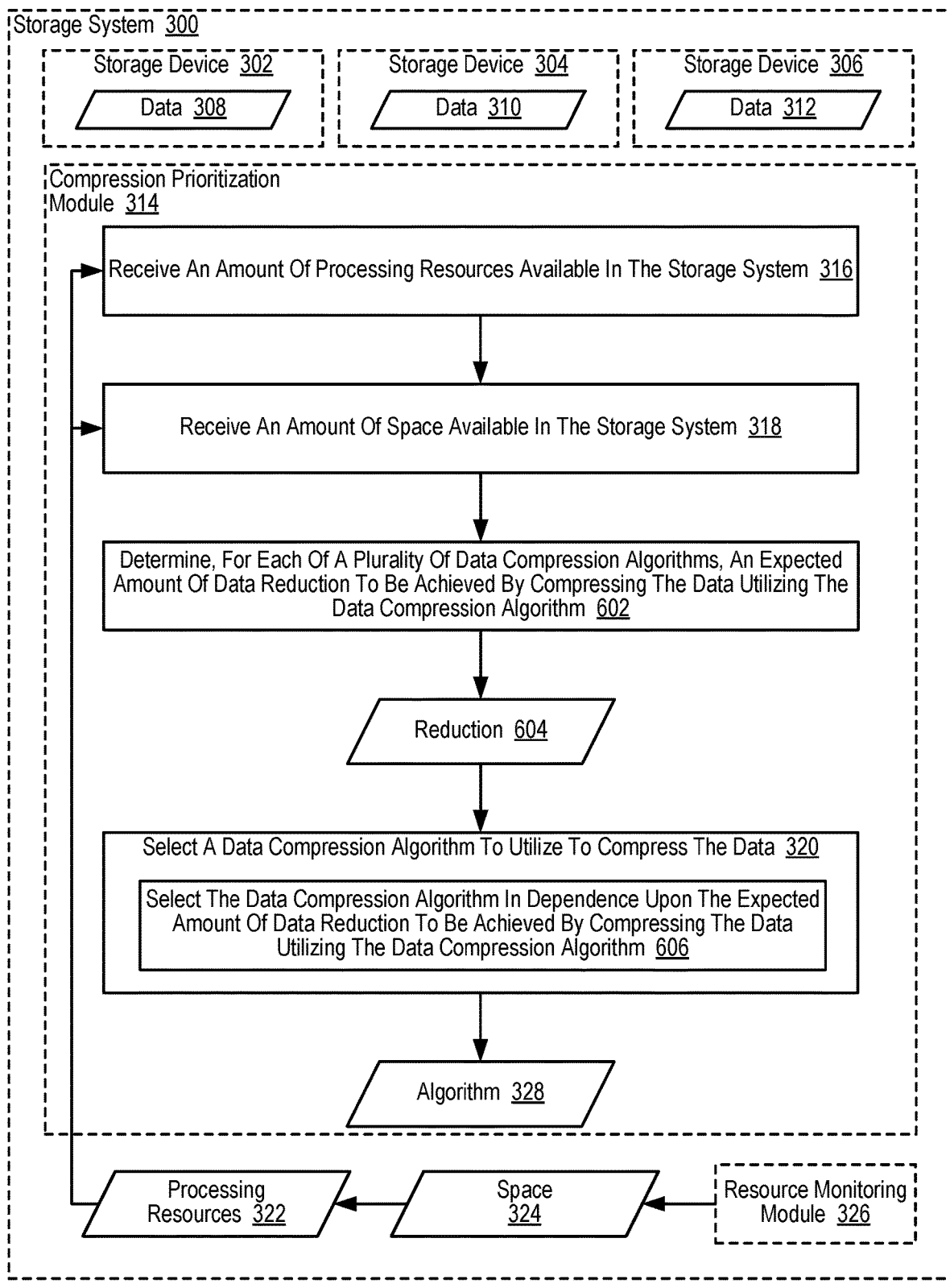
FIG. 6 sets forth a flow chart illustrating a further example method for compressing data in dependence upon characteristics of a storage system according to embodiments of the present disclosure.

For further explanation, FIG. 6 sets forth a flow chart illustrating an additional example method for compressing data in dependence upon characteristics of a storage system (300) according to embodiments of the present disclosure. The example method depicted in FIG. 6 is similar to the example method depicted in FIG. 3, as the example method depicted in FIG. 6 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

The example method depicted in FIG. 6 also includes determining (602), for each of a plurality of data compression algorithms, an expected amount of data reduction (604) to be achieved by compressing the data (308, 310, 312) utilizing the data compression algorithm. The compression prioritization module (314) of FIG. 6 may determine (602) an expected amount of data reduction (604) to be achieved by compressing the data (308, 310, 312) utilizing the data compression algorithm, for example, through the use of historical information gathered when previously compressing data. If the compression prioritization module (314) analyzes historical information gathered when previously compressing data to determine, for example, that a first compression algorithm historically achieves a data compression rate of 3:1, that a second compression algorithm historically achieves a data compression rate of 5:1, and that a third compression algorithm historically achieves a data compression rate of 8:1. In such a way, the expected amount of data reduction (604) to be achieved by compressing the data (308, 310, 312) utilizing the data compression algorithm may be determined (602) by assuming that the amount of data to be compressed will be reduced in a manner that is consistent with the historical data compression rate achieved by the data compression algorithm.

In the example method depicted in FIG. 6, determining (602) the expected amount of data reduction (604) to be achieved by compressing the data (308, 310, 312) utilizing the data compression algorithm may be carried out by the compression prioritization module (314) receiving one or more messages describing the historical data compression rate achieved by each data compression algorithm. The one or more messages describing the historical data compression rate achieved by each data compression algorithm may be received, for example, from a resource monitoring module (326) that tracks the performance of various compression algorithms or by any other module that is included in the storage system (300) or operable to otherwise manage the storage system (300). Alternatively, the historical data compression rate achieved by each data compression algorithm may be tracked by the compression prioritization module (314) itself.

In the example method depicted in FIG. 6, the data compression algorithm (328) to utilize is further selected (606) in dependence upon the expected amount of data reduction (604) to be achieved by compressing the data (308, 310, 312) utilizing the data compression algorithm. Selecting (606) a data compression algorithm (328) to utilize to compress the data (308, 310, 312) in dependence upon the expected amount of data reduction (604) to be achieved by compressing the data (308, 310, 312) utilizing the data compression algorithm may be carried out, for example, by applying one or more predetermined formulas that utilizes the expected amount of data reduction (604) to be achieved by compressing the data (308, 310, 312) utilizing the data compression algorithm as an input. Such predetermined formulas may be utilized, for example, to generate a score for each available data compression algorithm, where the data compression algorithm with the lowest or highest score (depending on the particular construction of the predetermined formulas) is ultimately selected (606).

Readers will appreciate that when the expected amount of data reduction (604) to be achieved by compressing the data (308, 310, 312) utilizing the data compression algorithm is relatively high, such a data compression algorithm may be selected (606) when the amount of free space within the storage system (300) is relatively low, even if executing such a data compression algorithm consumes relatively large amounts of processing resources. Alternatively, when the amount of free space within the storage system (300) is relatively high, less emphasis may be placed on selecting (606) a data compression algorithm whose expected amount of data reduction (604) is relatively high.

Figure 7:
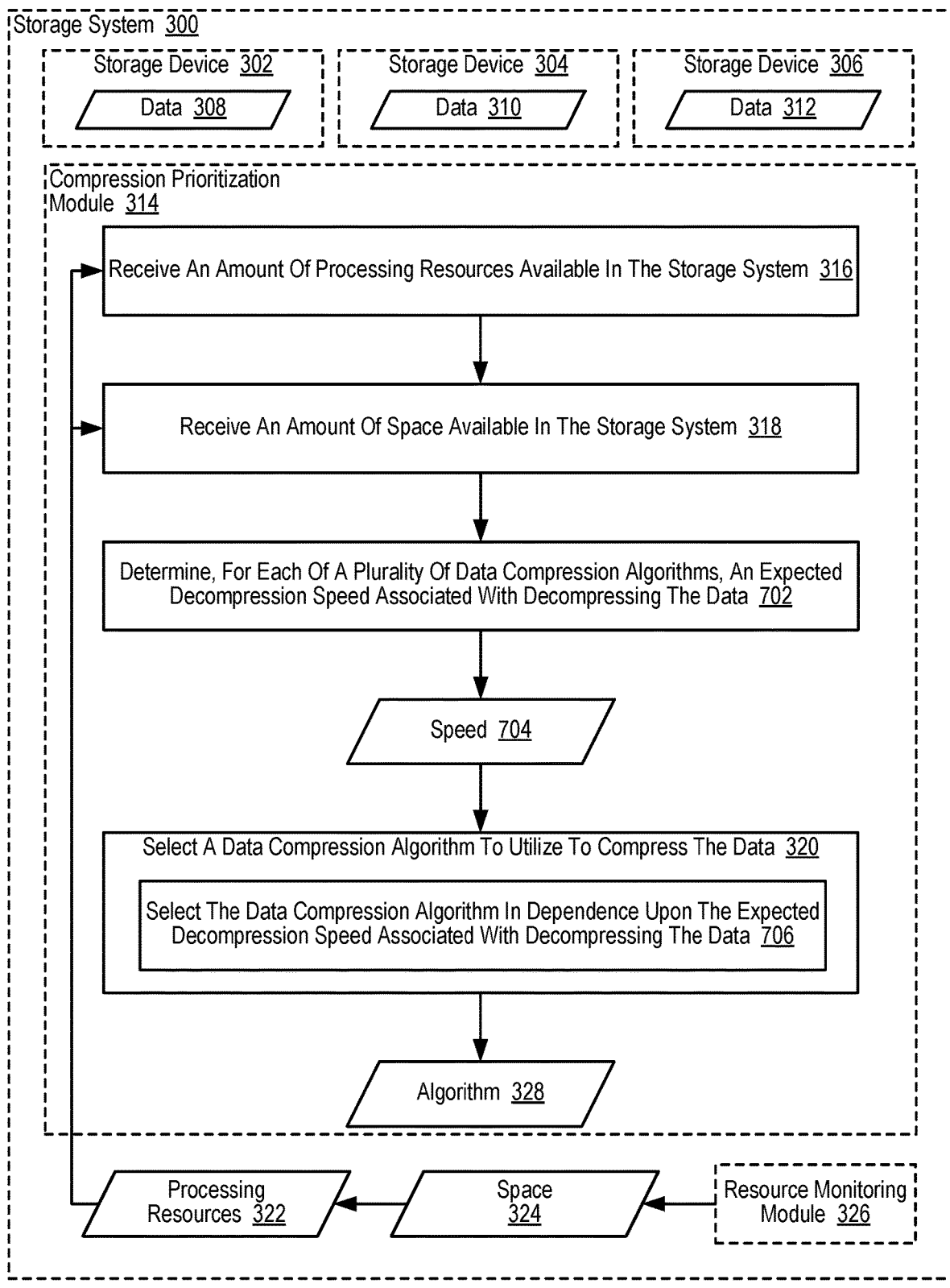
FIG. 7 sets forth a flow chart illustrating a further example method for compressing data in dependence upon characteristics of a storage system according to embodiments of the present disclosure.

For further explanation, FIG. 7 sets forth a flow chart illustrating an additional example method for compressing data in dependence upon characteristics of a storage system (300) according to embodiments of the present disclosure. The example method depicted in FIG. 7 is similar to the example method depicted in FIG. 3, as the example method depicted in FIG. 7 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

The example method depicted in FIG. 7 also includes determining (702), for each of a plurality of data compression algorithms, an expected decompression speed (704) associated with decompressing the data (308, 310, 312). The compression prioritization module (314) of FIG. 7 may determine (702) the expected decompression speed (704) associated with decompressing the data (308, 310, 312) utilizing the data compression algorithm, for example, by identifying attributes of the data (308, 310, 312) and analyzing historical information gathered when previously decompressing data with similar attributes. The attributes of the data can include information such as, for example, the type of application that initially wrote the data (308, 310, 312) to the storage system (300), the size of the data (308, 310, 312), and so on. In such a way, the expected decompression speed (704) associated with decompressing the data (308, 310, 312) is specific to the actual data (308, 310, 312) stored on the storage system (300). The expected decompression speed (704) associated with decompressing the data (308, 310, 312) utilizing the data compression algorithm may be determined (702) by assuming that the data (308, 310, 312) will be decompressed at a speed that is consistent with the historical decompression speed for similar data.

In the example method depicted in FIG. 7, determining (702) the expected decompression speed (704) associated with decompressing the data (308, 310, 312) utilizing the data compression algorithm may be carried out by the compression prioritization module (314) receiving one or more messages describing the historical decompression speed achieved by each data compression algorithm for different types of data. The one or more messages describing the historical decompression speed achieved by each data compression algorithm for different types of data may be received, for example, from a resource monitoring module (326) that tracks the performance of various compression algorithms or by any other module that is included in the storage system (300) or operable to otherwise manage the storage system (300). Alternatively, the historical decompression speed achieved by each data compression algorithm for different types of data may be tracked by the compression prioritization module (314) itself.

In the example method depicted in FIG. 7, the data compression algorithm (328) to utilize is further selected (706) in dependence upon the decompression speed (704) associated with decompressing the data (308, 310, 312). Selecting (706) a data compression algorithm (328) to utilize to compress the data (308, 310, 312) in dependence upon the decompression speed (704) associated with decompressing the data (308, 310, 312) may be carried out, for example, by applying one or more predetermined formulas that utilizes the decompression speed (704) associated with decompressing the data (308, 310, 312) as an input. Such predetermined formulas may be utilized, for example, to generate a score for each available data compression algorithm, where the data compression algorithm with the lowest or highest score (depending on the particular construction of the predetermined formulas) is ultimately selected (706).

Readers will appreciate that when the decompression speed (704) associated with decompressing the data (308, 310, 312) utilizing the data compression algorithm is relatively high, such a data compression algorithm may be selected (706) for data stored by applications that require relatively fast response times, even if utilizing such a data compression algorithm may result in relatively low levels of data reduction. Alternatively, data stored by applications that do not require relatively fast response times may be compressed utilizing data compression algorithms that deliver relatively high levels of data reduction, data compression algorithm that consume relatively low amounts of processing resources, and so on, even when the decompression speed (704) associated with decompressing the data (308, 310, 312) utilizing the data compression algorithm is relatively low.

Figure 8:
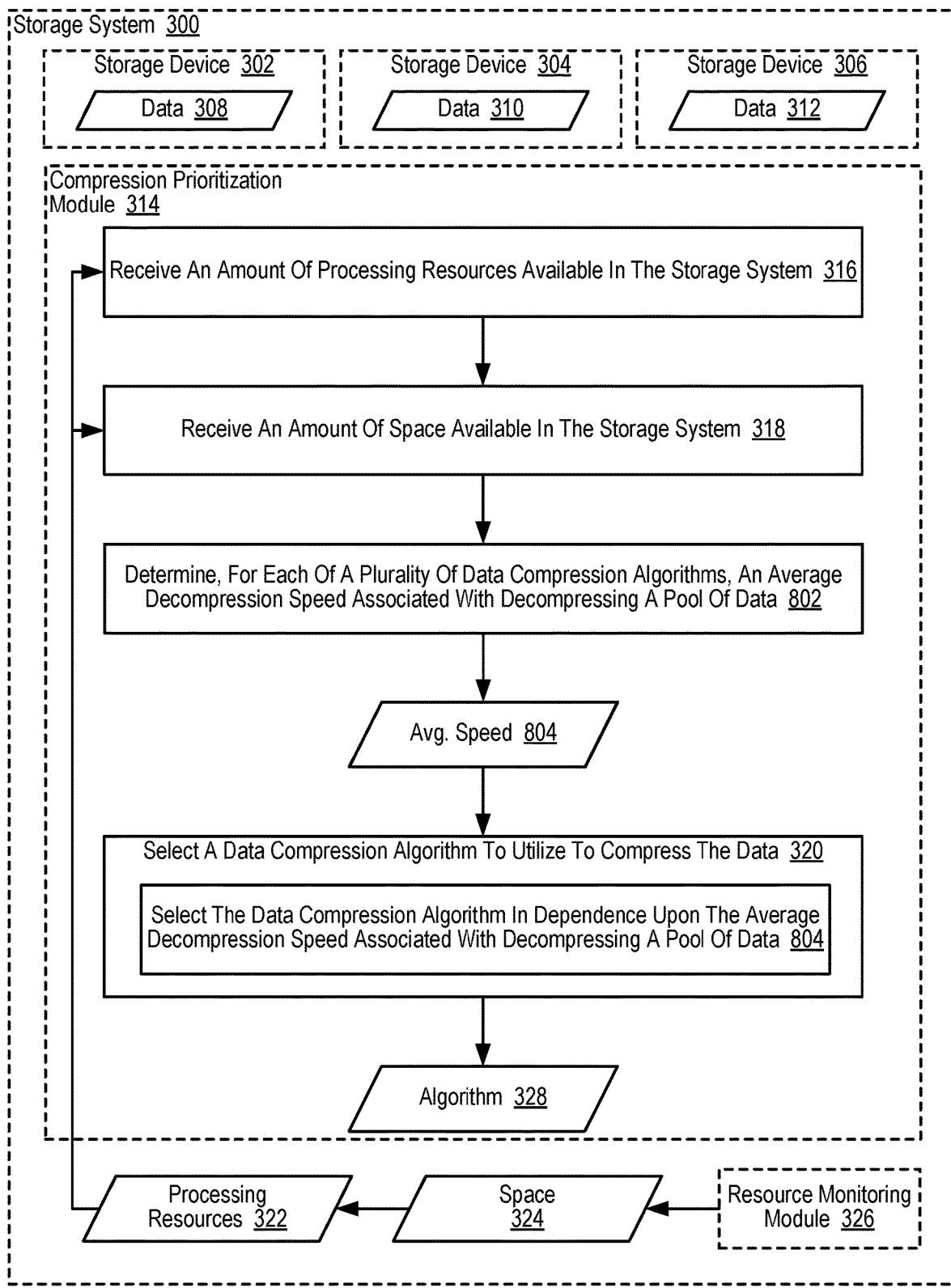
FIG. 8 sets forth a flow chart illustrating a further example method for compressing data in dependence upon characteristics of a storage system according to embodiments of the present disclosure.

For further explanation, FIG. 8 sets forth a flow chart illustrating an additional example method for compressing data in dependence upon characteristics of a storage system (300) according to embodiments of the present disclosure. The example method depicted in FIG. 8 is similar to the example method depicted in FIG. 3, as the example method depicted in FIG. 8 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

The example method depicted in FIG. 8 also includes determining (802), for each of a plurality of data compression algorithms, an average decompression speed (804) associated with decompressing a pool of data. The compression prioritization module (314) of FIG. 8 may determine (802) the average decompression speed (804) associated with decompressing a pool of data, for example, by analyzing historical information gathered when previously decompressing data. In such a way, the average decompression speed (804) associated with decompressing a pool of data is not specific to the actual data (308, 310, 312) stored on the storage system (300). The average decompression speed (804) associated with decompressing a pool of data utilizing the data compression algorithm may be determined (802) by assuming that the data (308, 310, 312) will be decompressed at a speed that is consistent with the historical decompression speed for the data compression algorithm.

In the example method depicted in FIG. 8, determining (802) average decompression speed (804) associated with decompressing a pool of data utilizing the data compression algorithm may be carried out by the compression prioritization module (314) receiving one or more messages describing the historical decompression speed achieved by each data compression algorithm. The one or more messages describing the historical decompression speed achieved by each data compression algorithm may be received, for example, from a resource monitoring module (326) that tracks the performance of various compression algorithms or by any other module that is included in the storage system (300) or operable to otherwise manage the storage system (300). Alternatively, the historical decompression speed achieved by each data compression algorithm may be tracked by the compression prioritization module (314) itself.

In the example method depicted in FIG. 8, the data compression algorithm (328) to utilize is further selected (806) in dependence upon the average decompression speed (804) associated with decompressing a pool of data. Selecting (806) a data compression algorithm (328) to utilize to compress the data (308, 310, 312) in dependence upon the average decompression speed (804) associated with decompressing a pool of data may be carried out, for example, by applying one or more predetermined formulas that utilizes the average decompression speed (804) associated with decompressing a pool of data as an input. Such predetermined formulas may be utilized, for example, to generate a score for each available data compression algorithm, where the data compression algorithm with the lowest or highest score (depending on the particular construction of the predetermined formulas) is ultimately selected (806).

Readers will appreciate that when the average decompression speed (804) associated with decompressing a pool of data utilizing the data compression algorithm is relatively high, such a data compression algorithm may be selected (806) for data stored by applications that require relatively fast response times, even if utilizing such a data compression algorithm may result in relatively low levels of data reduction. Alternatively, data stored by applications that do not require relatively fast response times may be compressed utilizing data compression algorithms that deliver relatively high levels of data reduction, data compression algorithm that consume relatively low amounts of processing resources, and so on, even when average decompression speed (804) associated with decompressing a pool of data utilizing the data compression algorithm is relatively low.

Figure 9:
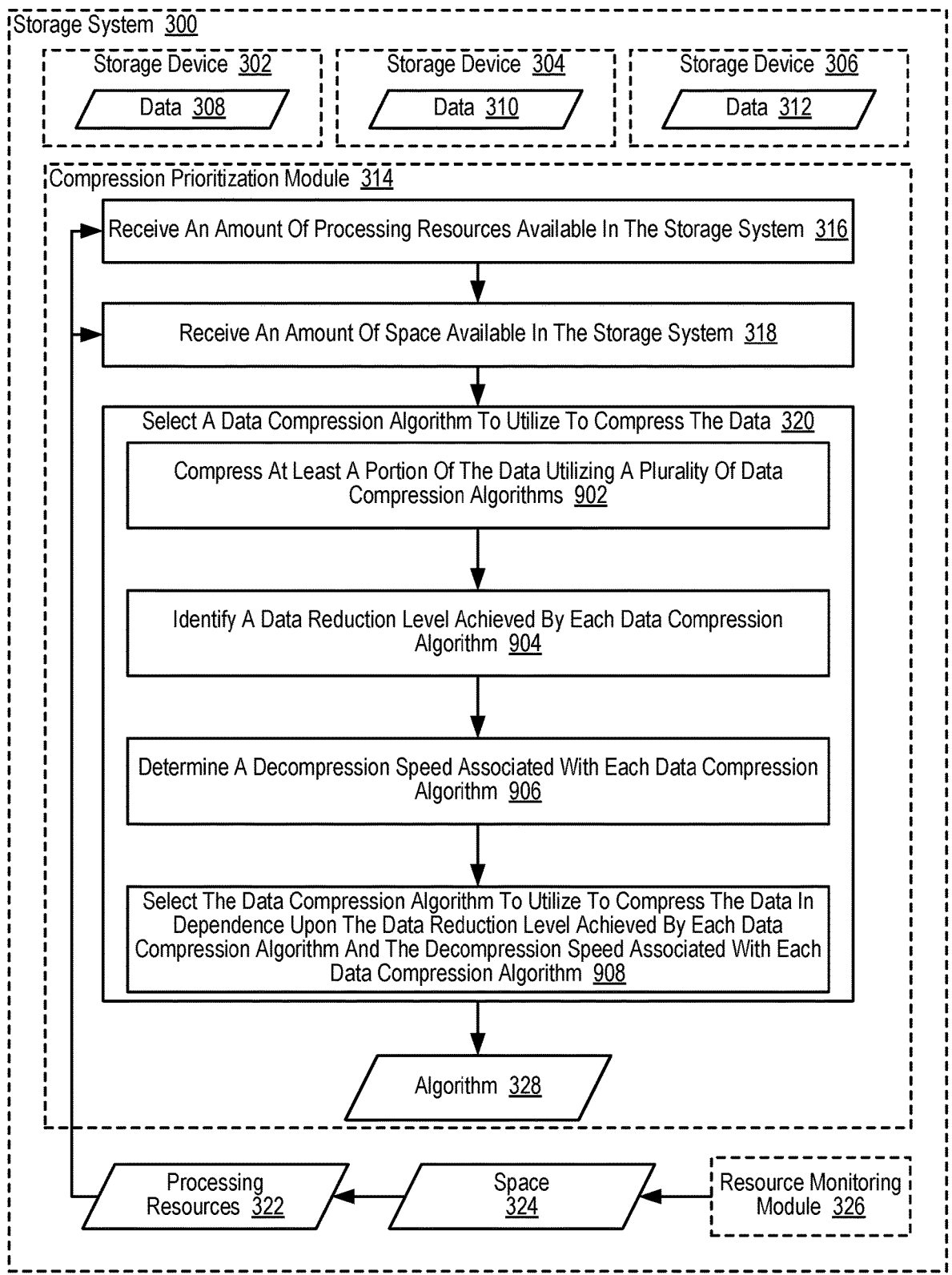
FIG. 9 sets forth a flow chart illustrating a further example method for compressing data in dependence upon characteristics of a storage system according to embodiments of the present disclosure.

For further explanation, FIG. 9 sets forth a flow chart illustrating an additional example method for compressing data in dependence upon characteristics of a storage system (300) according to embodiments of the present disclosure. The example method depicted in FIG. 9 is similar to the example method depicted in FIG. 3, as the example method depicted in FIG. 9 also includes receiving (316) an amount of processing resources (322) available in the storage system (300), receiving (318) an amount of space (324) available in the storage system (300), and selecting (320) a data compression algorithm (328) to utilize to compress the data (308, 310, 312) in dependence upon the priority for conserving the amount of processing resources (322) and the amount of space (324).

In the example method depicted in FIG. 9, selecting (320) a data compression algorithm (328) to utilize to compress the data (308, 310, 312) can include compressing (902) at least a portion of the data (308, 310, 312) utilizing a plurality of data compression algorithms. Compressing (902) at least a portion of the data (308, 310, 312) utilizing a plurality of data compression algorithms may be carried out, for example, by compressing the same portion of the data (308, 310, 312) utilizing a plurality of data compression algorithms. Alternatively, compressing (902) at least a portion of the data (308, 310, 312) utilizing a plurality of data compression algorithms may be carried out by compressing a first portion of the data (308, 310, 312) utilizing a first data compression algorithm, compressing a second portion of the data (308, 310, 312) utilizing a second data compression algorithm, compressing a third portion of the data (308, 310, 312) utilizing a third data compression algorithm, and so on.

In the example method depicted in FIG. 9, selecting (320) a data compression algorithm (328) to utilize to compress the data (308, 310, 312) can also include identifying (904) a data reduction level achieved by each data compression algorithm. Identifying (904) a data reduction level achieved by each data compression algorithm may be carried out, for example, by determining the original size of the portion of the data (308, 310, 312) that was compressed utilizing a particular data compression algorithm and also determining the size of the resultant compressed data that was produced utilizing the particular data compression algorithm. For example, if the original size of the portion of the data (308, 310, 312) that was compressed utilizing a first data compression algorithm was 1 MB and the size of the resultant compressed data that was produced utilizing the first data compression algorithm was 0.2 MB, the data reduction level achieved by the first data compression algorithm would be 5:1. Such a calculation may be made for each data compression algorithm that was utilized to compress (902) at least a portion of the data (308, 310, 312), such that the data reduction level achieved by each data compression algorithm may be identified (904).

In the example method depicted in FIG. 9, selecting (320) a data compression algorithm (328) to utilize to compress the data (308, 310, 312) can also include determining (906) an expected decompression speed associated with each data compression algorithm. The compression prioritization module (314) of FIG. 9 may determine (906) the expected decompression speed associated with each data compression algorithm, for example, by identifying attributes of the data (308, 310, 312) and analyzing historical information gathered when previously decompressing data with similar attributes. The attributes of the data can include information such as, for example, the type of application that initially wrote the data (308, 310, 312) to the storage system (300), the size of the data (308, 310, 312), and so on. In such a way, the expected decompression speed associated with each data compression algorithm may be specific to the actual data (308, 310, 312) stored on the storage system (300). The expected decompression speed associated with each data compression algorithm may be determined (904) by assuming that the data (308, 310, 312) will be decompressed at a speed that is consistent with the historical decompression speed for similar data.

In the example method depicted in FIG. 9, determining (906) an expected decompression speed associated with each data compression algorithm may be carried out by the compression prioritization module (314) receiving one or more messages describing the historical decompression speed achieved by each data compression algorithm for different types of data. The one or more messages describing the historical decompression speed achieved by each data compression algorithm for different types of data may be received, for example, from a resource monitoring module (326) that tracks the performance of various compression algorithms, by the compression prioritization module (314) itself, or by any other module that is included in the storage system (300) or operable to otherwise manage the storage system (300).

In the example method depicted in FIG. 9, selecting (320) a data compression algorithm (328) to utilize to compress the data (308, 310, 312) can also include selecting (908) the data compression algorithm to utilize to compress the data (308, 310, 312) in dependence upon the data reduction level achieved by each data compression algorithm and the decompression speed associated with each data compression algorithm. Selecting (908) the data compression algorithm to utilize to compress the data (308, 310, 312) in dependence upon the data reduction level achieved by each data compression algorithm and the decompression speed associated with each data compression algorithm may be carried out, for example, by applying a predetermined formula that utilizes the data reduction level achieved by each data compression algorithm and the decompression speed associated with each data compression algorithm as inputs. Readers will appreciate that the predetermined formula may be configured to strike a balance between the data reduction level achieved by each data compression algorithm and the decompression speed associated with each data compression algorithm. For example, when the amount of space (324) available in the storage system is relatively low, the compression prioritization module (314) may select (908) to compress the data (308, 310, 312) using slower, heavier compression algorithms that consume relatively large amounts of computing resources and also produce relatively large amounts of data reduction, as a premium will be placed on data reduction rather than conservation of processing resources as the amount of space available in the storage system is reduced. Alternatively, when the amount of space (324) available in the storage system is relatively high, a premium may be placed increasing response times to I/O operations and, as such, data compression algorithms that achieve faster decompression speeds may be selected (908).

In the example embodiments described above, a data compression algorithm (328) to utilize to compress data (308, 310, 312) is selected (320) based on factors such as (but not limited to): the priority for conserving the amount of processing resources (322) and the amount of space (324); the amount of processing resources available in the storage system; the amount of space available in the storage system; the expected amount of space in the storage system to be consumed within a predetermined period of time; the expected amount of processing resources to be consumed by compressing the data utilizing the data compression algorithm; the expected amount of data reduction to be achieved by compressing the data utilizing the data compression algorithm; the expected decompression speed associated with decompressing the data; and the average decompression speed associated with decompressing a pool of data. While the example embodiments described above typically describe selecting a data compression algorithm (328) to utilize to compress data (308, 310, 312) based on only a small subset of such factors, such a description is included only for ease of explanation. Readers will appreciate that embodiments are contemplated where a data compression algorithm (328) to utilize to compress data (308, 310, 312) is selected (320) based on combinations of factors not expressly identified above, including utilizing all of the factors described above to select a data compression algorithm (328) to utilize to compress data (308, 310, 312). In fact, such factors may be given equal or unequal consideration in various embodiments of the present disclosure. Furthermore, a data compression algorithm (328) to utilize to compress data (308, 310, 312) may be selected (320) in further dependence on additional factors as will occur to those of skill in the art in view of the present disclosure.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   identifying an amount of processing resources available in a storage system;
   identifying an amount of space available to store additional data in the storage system;
   selecting, in dependence upon a priority for conserving the amount of processing resources and the amount of space available to store additional data, a data compression algorithm to utilize to compress the data;
   detecting that at least one of the amount of processing resources available in the storage system or the amount of space available to store additional data in the storage system has changed; and
   responsive to detecting that at least one of the amount of processing resources available in the storage system or the amount of space available to store additional data in the storage system has changed, selecting a different data compression algorithm to utilize to compress data.

2. The method of claim 1 further comprising:
   determining an expected amount of space in the storage system to be consumed within a predetermined period of time; and
   wherein the data compression algorithm to utilize is further selected in dependence upon the expected amount of space in the storage system to be consumed within the predetermined period of time.

3. The method of claim 1 further comprising:
   determining, for each of a plurality of data compression algorithms, an expected amount of processing resources to be consumed by compressing the data utilizing the data compression algorithm; and
   wherein the data compression algorithm to utilize is further selected in dependence upon the expected amount of processing resources to be consumed by compressing the data utilizing the data compression algorithm.

4. The method of claim 1 further comprising:
   determining, for each of a plurality of data compression algorithms, an expected amount of data reduction to be achieved by compressing the data utilizing the data compression algorithm; and wherein the data compression algorithm to utilize is further selected in dependence upon the expected amount of data reduction to be achieved by compressing the data utilizing the data compression algorithm.

5. The method of claim 1 further comprising:

determining, for each of a plurality of data compression algorithms, an expected decompression speed associated with decompressing the data; and wherein the data compression algorithm to utilize is further selected in dependence upon the expected decompression speed associated with decompressing the data.

6. The method of claim 1 further comprising:

determining, for each of a plurality of data compression algorithms, an average decompression speed associated with decompressing a pool of data; and wherein the data compression algorithm to utilize is further selected in dependence upon the average decompression speed associated with decompressing a pool of data.

7. The method of claim 1 wherein selecting the data compression algorithm to utilize to compress the data further comprises:

compressing at least a portion of the data utilizing a plurality of data compression algorithms;

identifying a data reduction level achieved by each data compression algorithm;

determining a decompression speed associated with each data compression algorithm; and selecting the data compression algorithm to utilize to compress the data in dependence upon the data reduction level achieved by each data compression algorithm and the decompression speed associated with each data compression algorithm.

8. An apparatus, the apparatus including a computer processor and a computer memory, the computer memory including computer program instructions that, when executed, cause the apparatus to carry out the steps of:

identifying an amount of processing resources available in a storage system;

identifying an amount of space available to store additional data in a storage system;

selecting, in dependence upon a priority for conserving the amount of processing resources and the amount of space available to store additional data, a data compression algorithm to utilize to compress the data;

detecting that at least one of the amount of processing resources available in the storage system or the amount of space available to store additional data in the storage system has changed; and responsive to detecting that at least one of the amount of processing resources available in the storage system or the amount of space available to store additional data in the storage system has changed, selecting a different data compression algorithm to utilize to compress data.

9. The apparatus of claim 8 further comprising computer program instructions that, when executed, cause the apparatus to carry out the step of:

determining an expected amount of space in the storage system to be consumed within a predetermined period of time; and wherein the data compression algorithm to utilize is further selected in dependence upon the expected amount of space in the storage system to be consumed within the predetermined period of time.

10. The apparatus of claim 8 further comprising computer program instructions that, when executed, cause the apparatus to carry out the step of:

determining, for each of a plurality of data compression algorithms, an expected amount of processing resources to be consumed by compressing the data utilizing the data compression algorithm; and wherein the data compression algorithm to utilize is further selected in dependence upon the expected amount of processing resources to be consumed by compressing the data utilizing the data compression algorithm.

11. The apparatus of claim 8 further comprising computer program instructions that, when executed, cause the apparatus to carry out the step of:

determining, for each of a plurality of data compression algorithms, an expected amount of data reduction to be achieved by compressing the data utilizing the data compression algorithm; and wherein the data compression algorithm to utilize is further selected in dependence upon the expected amount of data reduction to be achieved by compressing the data utilizing the data compression algorithm.

12. The apparatus of claim 8 further comprising computer program instructions that, when executed, cause the apparatus to carry out the step of:

determining, for each of a plurality of data compression algorithms, an expected decompression speed associated with decompressing the data; and wherein the data compression algorithm to utilize is further selected in dependence upon the expected decompression speed associated with decompressing the data.

13. The apparatus of claim 8 further comprising computer program instructions that, when executed, cause the apparatus to carry out the step of:

determining, for each of a plurality of data compression algorithms, an average decompression speed associated with decompressing a pool of data; and wherein the data compression algorithm to utilize is further selected in dependence upon the average decompression speed associated with decompressing a pool of data.

14. The apparatus of claim 8 wherein selecting the data compression algorithm to utilize to compress the data further comprises:

compressing at least a portion of the data utilizing a plurality of data compression algorithms;

identifying a data reduction level achieved by each data compression algorithm;

determining a decompression speed associated with each data compression algorithm; and selecting the data compression algorithm to utilize to compress the data in dependence upon the data reduction level achieved by each data compression algorithm and the decompression speed associated with each data compression algorithm.

15. A computer program product, the computer program product disposed on a non-transitory computer readable storage medium, the computer program product comprising computer program instructions that, when executed, cause an apparatus to carry out the steps of:

identifying an amount of processing resources available in a storage system;

identifying an amount of space available to store additional data in the storage system;

selecting, in dependence upon a priority for conserving the amount of processing resources and the amount of space available to store additional data, a data compression algorithm to utilize to compress the data;

detecting that at least one of the amount of processing resources available in the storage system or the amount of space available to store additional data in the storage system has changed; and responsive to detecting that at least one of the amount of processing resources available in the storage system or the amount of space available to store additional data in the storage system has changed, selecting a different data compression algorithm to utilize to compress data.

16. The computer program product of claim 15 further comprising computer program instructions that, when executed, cause the apparatus to carry out the step of:

determining an expected amount of space in the storage system to be consumed within a predetermined period of time; and wherein the data compression algorithm to utilize is further selected in dependence upon the expected amount of space in the storage system to be consumed within the predetermined period of time.

17. The computer program product of claim 15 further comprising computer program instructions that, when executed, cause the apparatus to carry out the step of:

determining, for each of a plurality of data compression algorithms, an expected amount of processing resources to be consumed by compressing the data utilizing the data compression algorithm; and wherein the data compression algorithm to utilize is further selected in dependence upon the expected amount of processing resources to be consumed by compressing the data utilizing the data compression algorithm.

18. The computer program product of claim 15 further comprising computer program instructions that, when executed, cause the apparatus to carry out the step of:

determining, for each of a plurality of data compression algorithms, an expected amount of data reduction to be achieved by compressing the data utilizing the data compression algorithm; and wherein the data compression algorithm to utilize is further selected in dependence upon the expected amount of data reduction to be achieved by compressing the data utilizing the data compression algorithm.

19. The computer program product of claim 15 further comprising computer program instructions that, when executed, cause the apparatus to carry out the step of:

determining, for each of a plurality of data compression algorithms, an expected decompression speed associated with decompressing the data; and wherein the data compression algorithm to utilize is further selected in dependence upon the expected decompression speed associated with decompressing the data.

20. The computer program product of claim 15 further comprising computer program instructions that, when executed, cause the apparatus to carry out the step of:

determining, for each of a plurality of data compression algorithms, an average decompression speed associated with decompressing a pool of data; and wherein the data compression algorithm to utilize is further selected in dependence upon the average decompression speed associated with decompressing a pool of data.

\* \* \* \* \*